UNITED STATES PATENT OFFICE.

HUGUES ROSALT, OF PARIS, FRANCE.

TREATMENT OF ORES FOR THE EXTRACTION OF METALS THEREFROM.

948,827. Specification of Letters Patent. Patented Feb. 8, 1910.

No Drawing. Application filed November 14, 1907. Serial No. 402,204.

*To all whom it may concern:*

Be it known that I, HUGUES ROSALT, a citizen of the Republic of France, residing at 139 Boulevard St. Michel, Paris, in the Republic of France, chemist, have invented certain new and useful Improvements in or Relating to the Treatment of Ores for the Extraction of Metals Therefrom, of which the following is a specification.

The present invention relates to an improved wet process for the extraction of metals, such for instance as nickel, cobalt, copper, gold or tungsten from their ores, for instance those where iron occurs as an impurity. These ores may be in the form of sulfids, arsenates, sulfo-arsenates, oxids or silicates, and in the case of the three former or any analogous kinds of ores, the same may be roasted before treatment.

This process is based upon the employment, in the treatment of the ores, of ozone and a chloridizing agent, such as chlorin or hydrochloric acid, which are caused to act jointly upon the ores while the latter are in a very finely divided state, all as hereinafter more fully described. The chlorin necessary for this operation can be produced in any suitable way, but may for example be obtained by the decomposition of chlorid of magnesium, and a continuous process may thus be established in which the chlorid of magnesium is regenerated over and over again.

As a detailed description of the process one may take as an example, the mineral "garnierite"—a hydro-silicate of nickel and magnesium accompanied by oxid of iron. This is the nickel ore of New Caledonia. It is to be understood however that the process is applicable to all the minerals mentioned above.

As above noted, the chlorin for this operation may be obtained by the decomposition of chlorid of magnesium, this operation being according to the equation:—

which can be readily decomposed into $H_2O$ and nascent chlorin by the action of ozone.

During the time that the chlorin is being generated ready to be directed on to the ores or minerals to be treated, hydrate of magnesium is formed in the solution and deposits in the form of a precipitate or magma. This is separated by filtration, to be used as hereafter described as the precipitating agent in the separation of the metals.

The ore or mineral (after, if necessary, roasting in the case of sulfids or arsenates) is ground with the addition of water as finely as possible. While this grinding operation is being carried out, the ore is simultaneously subjected to the action of chlorin or other suitable chloridizing agent, and at the same time there is directed into the apparatus a current of ozonized air. In this manner intimate contact is set up between the different substances present while the action of the chlorin or hydrochloric acid or other suitable chloridizing agent is greatly increased by the presence of ozone which splits up the molecules as it were, so that chlorin in the nascent condition is set free to act on the metallic constituents of the ore and thus all the metals present are converted into chlorids in the fullest possible degree of chlorination, that is to say the highest chlorids of the ore are obtained, the iron for example becoming ferric chlorid instead of ferrous chlorid. Moreover the ozone serves also to fully oxidize any other materials, such as iron compounds, which may be present, thus converting them into a condition wherein they can be more readily chlorinated or brought into solution. This chlorination in the presence of ozone being ended, the whole mass is passed into the filter press and the liquid chlorids are separated from the residue. The same is afterward washed two or three times in order to extract the whole of the soluble materials. These filtrates or washing waters are again added to the original solution for further use in the treatment for the separation of the metals. Thus in the present example, there is in this original solution only chlorid of magnesium ($MgCl_2$), of nickel ($NiCl_2$) or of cobalt ($CoCl_2$) and perchlorid of iron ($Fe_2Cl_6$). These metals are successively precipitated in the form of oxids or hydrates for the separation of one from the other.

By a preliminary test, one determines the exact quantity of magnesium magma necessary to precipitate all the iron contained in the complex chlorid mixture. The predetermined quantity of magma is added to this liquid, and all the iron is precipitated in the state of hydrated sesqui-oxid (iron ocher).

By a treatment in the filter press one collects the residual ocher which is washed with water, and the remaining solutions containing chlorid of magnesium nickel and cobalt are added together. If in the residual iron oxid there should be left a little nickel or cobalt in the state of oxid, they are treated with ammonia which dissolves only these two oxids. In the liquid thus obtained, the nickel is precipitated as hydrated oxid $(NiO.H_2O)$ in the same manner as the iron.

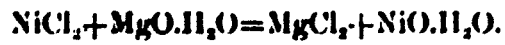

The nickel and the cobalt are both completely precipitated together. The whole is passed through the filter press, and the precipitate is washed and in the solutions nothing remains but chlorid of magnesium. These solutions can be re-generated thus recovering the chlorin and the magnesium magma, to be employed again in a new series of operations.

It is to be understood that the invention is in no way limited to a regenerative process such as described, as the action of ozone and a chloridixing agent may be employed alone in any process of ore treatment or extraction to which it may be found to be applicable. Moreover in some cases the chlorination action may be carried out at one stage and then the ozonixing action may be applied to the chlorids or chlorid solutions in order to insure their being in the highest degree of chlorination.

What I claim and desire to secure by Letters Patent of the United States is:—

1. In the treatment of ores in the wet way, the step which consists in treating the ore with a chloridixing mixture in sufficient quantity to insure the formation of the highest chlorids obtainable in the wet way, and simultaneously introducing ozone to liberate the chlorin from the said mixture in the nascent state.

2. In the treatment of ores in the wet way, the process which consists in treating ores with chlorin and ozone and precipitating any chlorid solutions that may be formed by magnesium hydrate substantially as described.

3. In the treatment of ores in the wet way, the process which consists in treating ores with chlorin obtained by decomposing magnesium chlorid, collecting the magnesium hydrate resulting from the decomposition, and using it to precipitate any metallic chlorid solutions obtained by the joint action of the chloridixing agent and the ozone, substantially as described.

In testimony whereof I have hereunto set my hand in presence of two subscribing witnesses this 5th day of November 1907.

HUGUES ROSALT.

Witnesses:
JULIUS MOELLER,
C. BARNARD BURDON.